US006734982B2

(12) United States Patent
Banet et al.

(10) Patent No.: US 6,734,982 B2
(45) Date of Patent: May 11, 2004

(54) METHOD AND DEVICE FOR MEASURING THE THICKNESS OF THIN FILMS NEAR A SAMPLE'S EDGE AND IN A DAMASCENE-TYPE STRUCTURE

(76) Inventors: Matthew J. Banet, Two Union Park, No. 4, Boston, MA (US) 02118; Martin Fuchs, 11 Sophia Dr., Uxbridge, MA (US) 01569; John A. Rogers, 7412 Berkeley Cir., Castle Rock, CO (US) 80104

( * ) Notice: Subject to any disclaimer, the term of this patent is extended or adjusted under 35 U.S.C. 154(b) by 108 days.

(21) Appl. No.: 09/795,015

(22) Filed: Feb. 28, 2001

(65) Prior Publication Data

US 2003/0058449 A1 Mar. 27, 2003

Related U.S. Application Data

(63) Continuation of application No. 09/067,411, filed on Apr. 27, 1998, now Pat. No. 6,256,100.

(51) Int. Cl.[7] .............................................. G01B 11/06
(52) U.S. Cl. ....................................... 356/630; 356/432
(58) Field of Search ................................ 356/432, 630; 73/800

(56) References Cited

U.S. PATENT DOCUMENTS

| 5,394,413 A | 2/1995 | Zayhowski .................... 372/10 |
| 5,546,811 A | 8/1996 | Rogers et al. ................. 73/800 |
| 5,633,711 A | 5/1997 | Nelson et al. ............... 356/318 |
| 5,812,261 A | 9/1998 | Nelson et al. ............... 356/318 |

OTHER PUBLICATIONS

"Ultrasonic Multilayer Metal Film Metrology", by Morath et al. Solid State Technology, Jun. 1997, pp. 85 92.

Primary Examiner—Richard A. Rosenberger

(57) ABSTRACT

A method for measuring a structure that contains overlying and underlying films in a region where the overlying film's thickness rapidly decreases until the underlying film is exposed (e.g., an edge-exclusion structure). The method includes the steps of: (1) exciting acoustic modes in a first portion of the region with at least one excitation laser beam; (2) detecting the acoustic modes with a probe laser beam that is either reflected or diffracted to generate a signal beam; (3) analyzing the signal beam to determine a property of the structure (e.g., the thickness of the overlying layer) in the first portion of the region; (4) translating the structure or the excitation and probe laser beams; and (5) repeating the exciting, detecting, and analyzing steps to determine a property of the structure in a second portion of the region.

26 Claims, 11 Drawing Sheets

METHOD AND DEVICE FOR MEASURING THE THICKNESS OF THIN FILMS NEAR A SAMPLE'S EDGE AND IN A DAMASCENE-TYPE STRUCTURE

CROSS REFERENCE TO RELATED APPLICATIONS

This is a continuation of application Ser. No. 09/067,411, filed Apr. 27, 1998, now U.S. Pat. No. 6,256,100.

BACKGROUND

This invention relates to methods for determining the thickness of thin films on small areas of structures used in microelectronics fabrication, e.g., near a semiconductor wafer's edge or on a damascene-type structure.

During the fabrication of microelectronic devices, thin films of metals and metal alloys are deposited on silicon wafers and for use as electrical conductors, adhesion-promoting layers, and diffusion barriers. Microprocessors, for example, use metal films of copper, tungsten, and aluminum as electrical conductors and interconnects, titanium and tantalum as adhesion-promoting layers, and titanium:nitride and tantalum:nitride as diffusion barriers. Thickness variations in these films can modify their electrical and mechanical properties, thereby affecting the performance of the microprocessor. The target thickness values of these films vary depending on their function: conductors and interconnects are typically 3000–10000 angstroms thick, while adhesion-promoting and diffusion-barrier layers are typically between 100–500 angstroms thick. The deposition of each of these films must be controlled such that the film's thickness is within a few percent (e.g., 5–100 angstroms, a value roughly equivalent to one or two seconds human fingernail growth) of its target value. Furthermore, the uniformity of the film over the surface of the wafer must be closely controlled in order to assure uniform behavior of the individual microprocessors and, consequently, high manufacturing yields. Because of these rigid tolerances, film thickness is often measured as a quality-control parameter during and/or after the microprocessor's fabrication.

The metal films are often deposited and patterned in complex geometries and this complicates the measurement process. In a typical fabrication process, a titanium:nitride film is deposited over the entire surface of a silicon wafer. A tungsten film is then deposited onto the titanium:nitride film to leave an "edge-exclusion zone", i.e., a small (about 1 or 2 mm) region where the titanium:nitride is exposed, near the wafer's edge. The edge-exclusion zone prevents delamination of the tungsten film neat its edges. Near this region, the thickness of the tungsten film rapidly increases to its target value; this takes place over a distance of a few hundred microns. Without this rapid increase in film thickness, devices patterned near the wafer's edge-exclusion zone will contain non-ideal tungsten films not having adequate thickness, and they will not meet specifications.

An example of a complicated film geometry recently introduced in commercial microelectronics fabrication is a "damascene" or "dual damascene" structure. These structures, used especially to form copper conductors and interconnects, are typically formed by a multi-step process: copper is first deposited onto a wafer having a dielectric layer that has been etched to have a series of trenches; the wafer is then polished by chemical-mechanical polishing (CMP) to remove excess copper, leaving only copper-filled trenches. The resulting structure is typically a series of separated copper lines having a thickness of a few thousand angstroms, a width of about 0.5 microns, a periodicity of about 2 microns, and a length of several millimeters.

Measuring film thickness in and near the edge-exclusion zone and in damascene-type structures is difficult and impractical using conventional techniques. For example, blanket metal films are typically measured using a 4-point probe. Here, two separated pair of conducting probes contact the film; electrical resistance, as measured by the probes, relates to the film's thickness. Because the spatial resolution of the 4-point probe is typically a few hundred millimeters, this instrument is impractical for both edge-profile and damascene-type structures. Moreover, a film's resistance often depends on both its thickness and geometry, a complication that further reduces the accuracy of the 4-point probe when used to measure complex geometries. Another film-measuring instrument, called a stylus profilometer, drags a stylus needle over a sample, recording variations in topography. This instrument, however, is slow, cumbersome, sensitive to slight amounts of sample curvature, and inaccurate when used to measure relatively long distances (e.g., the hundreds of microns required for tungsten build-up near the exclusion zone).

In addition to these disadvantages, both 4-point probes and stylus profilometers require contacting and thus contaminating a sample. These instruments are therefore typically used on monitor or test samples, rather than samples containing actual product. Other methods for measuring the thickness of metal films, such as X-ray fluorescence and Rutherford backscattering, are non-contact, but are slow and have poor spatial resolution.

SUMMARY

In general, in one aspect, the invention provides a method for measuring a structure that contains overlying and underlying films in a region where the overlying film's thickness rapidly decreases until the underlying film is exposed (e.g., an edge-exclusion structure). The method includes the steps of: (1) exciting acoustic modes in a first portion of the region with at least one excitation laser beam; (2) detecting the acoustic modes with a probe laser beam that is either reflected or diffracted to generate a signal beam; (3) analyzing the signal beam to determine a property of the structure (e.g., the thickness of the overlying layer) in the first portion of the region; (4) translating the structure or the excitation and probe laser beams; and (5) repeating the exciting, detecting, and analyzing steps to determine a property of the structure in a second portion of the region.

In one embodiment, the exciting, detecting, analyzing, and translating steps are repeated to determine a property of the structure in multiple portions of the region. In one case, the above-mentioned steps are repeated in an edge-exclusion structure until the thickness of the overlying film is measured from where the underlying film is exposed to where the overlying film's thickness is at least 80% of its average value. This particular method can be extended so that the steps are repeated in the structure until a diameter of the overlying film is measured. Typically, this "diameter scan" embodiment includes repeating the above-mentioned step on each side of the overlying film's diameter, and measuring multiple points near the center of the film.

In another embodiment, the exciting, detecting, analyzing, and translating steps are repeated until a property of the underlying film (e.g., the width of the edge-exclusion zone) is measured from where it is exposed to the edge of the wafer.

In typical embodiments: the overlying film is selected from a metal such as tungsten, copper, aluminum, and alloys thereof; the underlying film is selected from materials such as oxides, polymers, and metals such as titanium, titanium:nitride, tantalum, tantalum:nitride, and alloys thereof. These films are usually deposited on a silicon wafer.

The structure is typically measured using an optical method where the acoustic modes are excited with at least one optical pulse having a duration less than 1 nanosecond. In a particular embodiment, the exciting step features exciting time-dependent acoustic modes in the structure by directing a spatially periodic excitation radiation field defined by a wavevector onto the sample. The radiation field, for example, is formed by overlapping two optical pulses in time and space in or on top of the sample. The detecting step then includes diffracting probe radiation off a modulated optical or mechanical property induced on the sample's surface by the acoustic modes. To determine thickness of the overlying layer, the density and acoustic properties of the overlying and underlying layers, the wavevector, and a frequency of the acoustic mode are analyzed (e.g., by comparing them to a mathematical model).

In another aspect, the invention features a method for measuring a structure comprising multiple thin, metallic, rectangular-shaped or linear regions, each having a width of less than 5 microns and being disposed between neighboring regions that include a second, non-metallic material (e.g., a damascene-type structure). The method includes the steps of: (1) exciting acoustic modes in at least one metallic, rectangular-shaped region by irradiating the region with a spatially periodic excitation field defined by a wavevector; (2) detecting the acoustic modes by diffracting a probe laser beam off a ripple morphology induced in the regions by the acoustic modes; and (3) analyzing the diffracted signal beam to determine a property of the structure (e.g., the thickness of the metallic, rectangular-shaped regions).

In a particular embodiment, the exciting step includes irradiating multiple metallic, rectangular-shaped regions with the excitation field. A probe laser beam is then diffracted off the surface ripple induced in each region by the acoustic modes. Thickness can be determined by analyzing a density and acoustic properties of the metal included in the region, the wavevector, and a frequency of the acoustic mode. Here, the width of the metallic, rectangular-shaped region or a distance separating consecutive regions may be used in the analysis. In still other embodiments, the signal beam can be further analyzed (e.g., by monitoring diffraction of the probe beam) to determine a width of the metallic, rectangular-shaped region or a distance separating consecutive metallic, rectangular-shaped regions.

In embodiments, each of the metallic, rectangular-shaped regions comprises copper, tungsten, aluminum, or alloys thereof, and have a width of less than 1 micron. The rectangular-shaped regions can also include more than one layer. For example, the trench may be lined with tantalum and then filled with copper.

In another aspect, the invention provides a method for measuring a structure comprising multiple thin, metallic, rectangular-shaped regions, each having a width of less than 1 micron and being disposed between neighboring regions comprising a second, non-metallic material. The method includes the steps of: (1) exciting acoustic modes in multiple metallic, rectangular-shaped regions by simultaneously irradiating the regions with a spatially periodic excitation field defined by a wavevector; (2) detecting the acoustic modes by diffracting a probe laser beam off a modulated optical or physical property induced in each of the regions by the acoustic modes; and (3) analyzing the signal beam to determine an average thickness of the metallic, rectangular-shaped regions irradiated by the excitation field.

The invention has many advantages. In particular, the method makes accurate measurements of film thickness in and near the edge-exclusion zone, in damascene-type structures, and in other small-scale structures. Measurements feature all the advantages of optical metrology, e.g., noncontact, rapid and remote measurement over a small region. The method collects data from a single measurement point having an area of between 10 and 100 microns in less than a few seconds. From these data film thickness in the small-scale structures is determined with an accuracy and repeatability of a few angstroms. For damascene-type structures, the method simultaneously measures the thickness multiple metal lines lying within the optical spot size with virtually no decrease in data quality, accuracy, or repeatability. For typical films used in a microelectronic device, the measurement determines thickness to within a fraction of a percent of the film's true value.

In addition to thickness, the measurement determines the width of an exclusion zone, the diameter of the useable area on the wafer, the film's slope near the edge-exclusion zone, and properties of damascene-type structures, such as the width and periodicity of the metal lines and the number of defects in the structure.

The optical system used to make these measurements is compact, occupying a footprint of about 2 square feet, and composed primarily of inexpensive, commercially available components.

Because of its small size, the optical instrument can be a stand-alone unit, or can be attached directly to a film-formation tool (e.g., a chemical-vapor deposition tool, a plasma-vapor deposition tool, a cluster tool, or a vacuum chamber) or a film-processing tool (e.g., a chemical-mechanical polisher). In these embodiments, the film-formation tool includes an optical port (e.g., a glass window) that is transparent to the excitation and probe radiation. Thus, during operation, the film-measuring instrument is oriented so that the excitation and probe radiation, and the diffraction signal, pass through the optical port.

Other features, aspects, and advantages of the invention follow from the following detailed description, and from the claims.

DETAILED DESCRIPTION

Figure 1A:
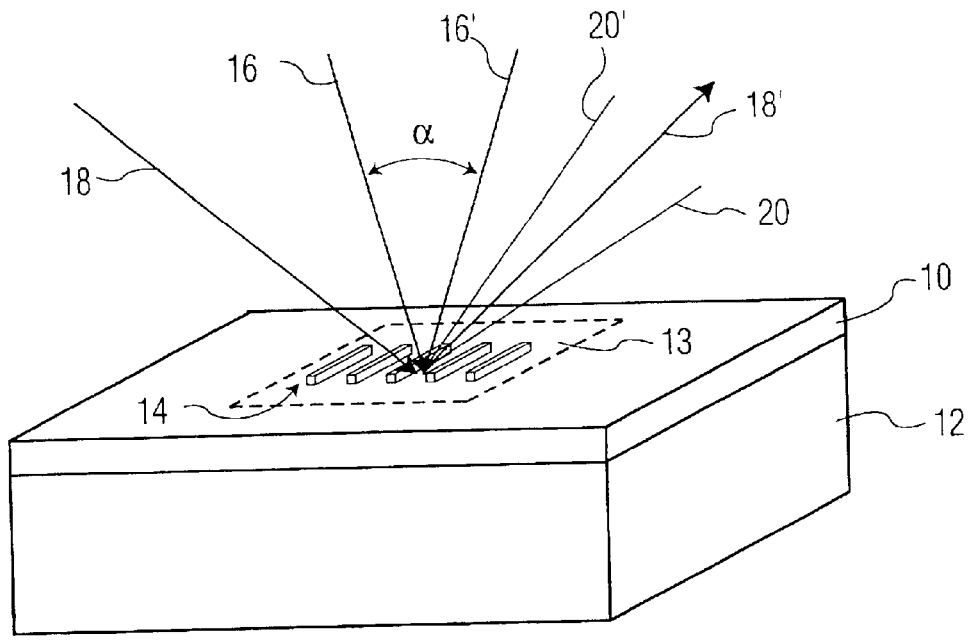
FIG. 1A is a schematic drawing showing an optical beam configuration of the optical system according to the invention.
Figure 1B:
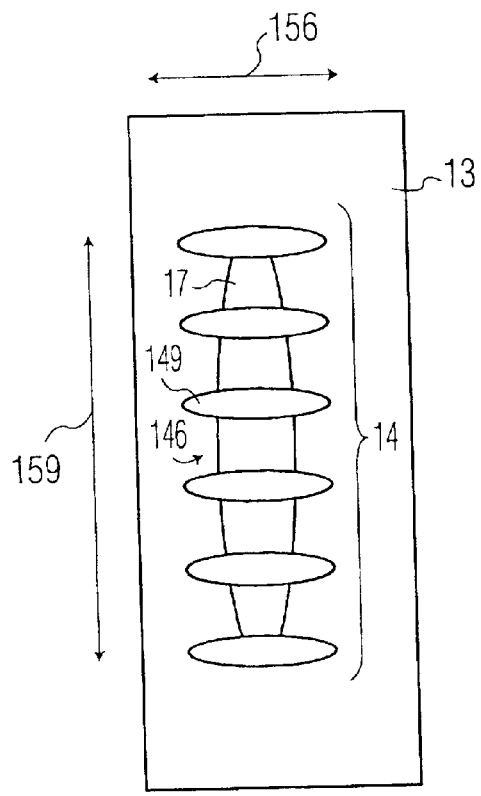
FIG. 1B is a top view of excitation and probe beams of FIG. 1A.
Figure 2:
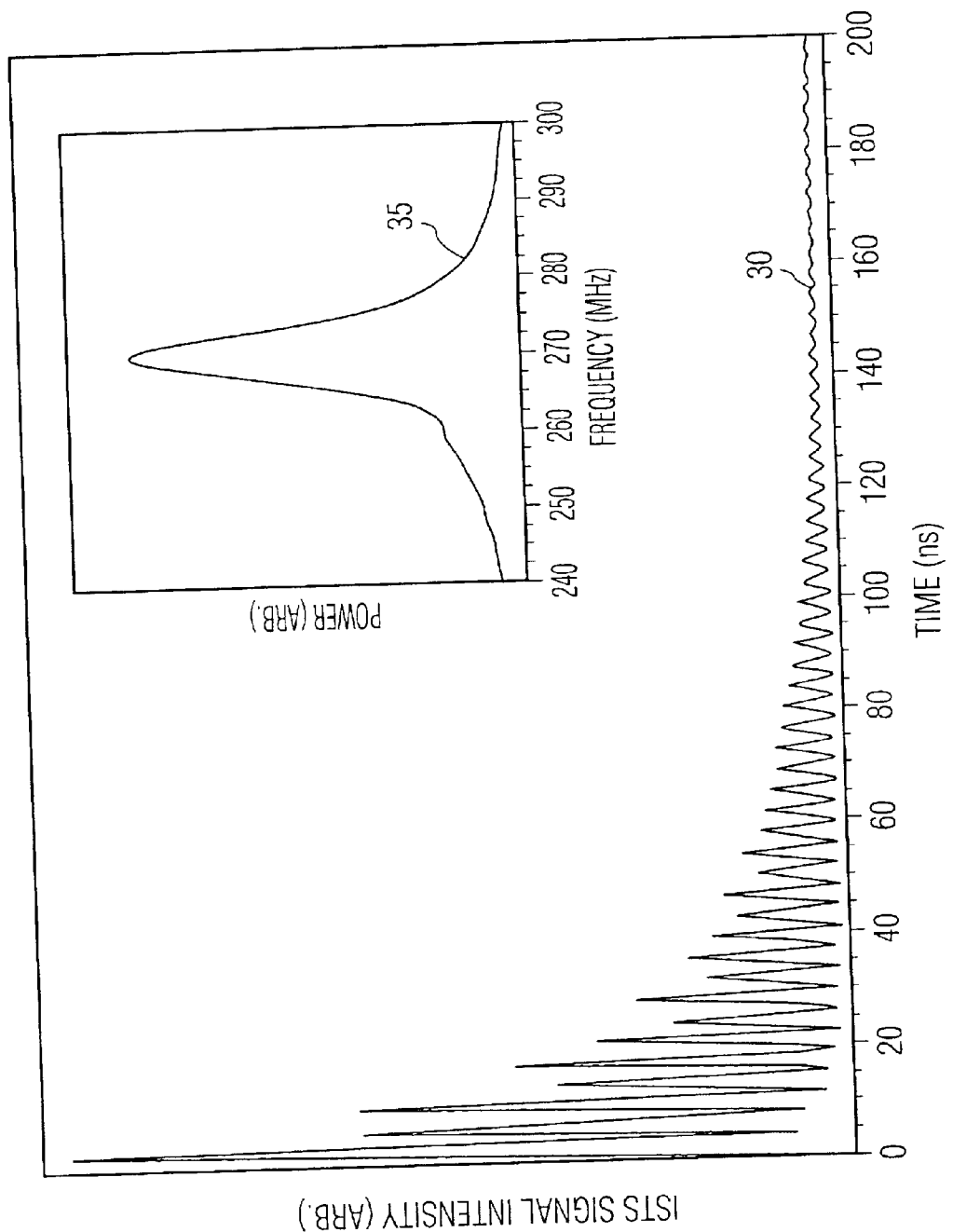
FIG. 2 is a plot (signal intensity vs. time) of a signal waveform measured from a copper film using the optical beam configuration of FIG. 1A.

In FIGS. 1A, 1B, and 2, a thickness of a thin film 10 disposed on a substrate 12 is measured in a small area 13 (e.g., in a damascene-type or edge-profile structure) when two excitation laser pulses 16, 16' and a probe laser pulse 18 irradiate the film. The excitation pulses 16, 16' are short in duration (e.g. about 0.5 nanoseconds), have a wavelength that is absorbed by the film, and are separated by an angle α. The probe pulse 18 is relatively long (e.g. several hundred nanoseconds or longer) and has a wavelength that is not strongly absorbed by the film. In this configuration, called a "four-wave mixing" geometry, the excitation pulses 16, 16' overlap in time and space and interfere to form a spatially and temporally varying excitation radiation field 14 in or on the surface of the film 10. The field 14 is composed of a series of periodic, sinusoidal "bright" regions 14a (i.e., constructive interference) and "dark" regions 14b (i.e., destructive interference). The length and width of the field 14, shown by the arrows 15a and 15b, are about 500 and 40 microns, respectively. When focused onto the film, the probe pulse 18 forms a second field 17 that is elliptical (roughly 90 microns by 25 microns) and lies completely within the excitation field 14.

The direction of the excitation field is defined by a wavevector that is inversely proportional to the spatial distance between consecutive bright (or dark) regions. The magnitude (q) of the wavevector is determined by the angle α between the excitation pulses and the wavelength $\lambda_1$ of each pulse using the equation $q=4\pi \sin(\alpha/2)(\lambda_1)^{-1}=2\pi/\Lambda$, where $\Lambda$ is the grating wavelength.

The excitation radiation field 14 excites acoustic modes in the film 10 that have a wavelength and orientation corresponding to the excitation wavevector. Excitation of the acoustic modes occurs via Impulsive Stimulated Thermal Scattering ("ISTS"), a four-wave mixing technique that is described in detail in U.S. Pat. No. 5,633,711 (entitled MEASUREMENT OF MATERIAL PROPERTIES WITH OPTICALLY INDUCED PHONONS), U.S. Pat. No. 5,546,811 (entitled OPTICAL MEASUREMENT OF STRESS IN THIN FILM SAMPLES), and U.S. Ser. No. 08/783,046 (entitled METHOD AND DEVICE FOR MEASURING FILM THICKNESS, filed Jul. 15, 1996), the contents of which are incorporated by reference. The acoustic modes induce a modulated optical and physical property in the film (e.g., a time-dependent "ripple" morphology and/or time-dependent refractive index change). In the case of an induced time-dependent ripple morphology, this can be observed on the film's surface. The frequency of the modulation depends on the thickness of the film. Acoustic modes are detected by diffracting the probe pulse off the modulated property to form at least two signal beams 20, 20' disposed on each side of a reflected probe beam 18'. A photodetector detects one or more of the signal beams to generate a signal waveform 30 similar to that shown in FIG. 2 which presents data taken from a nominal 3000 angstrom copper film. The Fourier transform of the signal waveform 30, indicated by the graph 35 in the figure inset, indicates the frequency of the acoustic mode. To determine film thickness, the frequency is analyzed along with the wavevector and the film's density and sound velocities, as described in the above-mentioned references.

Measurement of Small-Scale Structures

Accurate measurement of small-scale structures using ISTS depends on: 1) carefully choosing the optical properties of the excitation and probe pulses in the four-wave mixing geometry to obtain a data signal that allows one to make the measurements (e.g., a data signal with sufficient signal-to-noise ratio, amplitude, and number of excited modes); and 2) modifying the methods for calculating film thickness described in U.S. Ser. No. 08/783,046, entitled METHOD AND DEVICE FOR MEASURING FILM THICKNESS, filed Jul. 15, 1996) to account for the physical geometry small-scale structures.

Optical properties that can be adjusted include the wavevector (and hence the acoustic frequency and wavelength), orientation, and optical wavelength of the excitation and probe field. For example, when measuring a damascene-type structure, the long axes of both the excitation and probe fields are oriented along the extension of the metal lines. This ensures that the ISTS-generated acoustic modes propagate along the extension of the metal lines, and minimizes contributions to the signal arising from reflections at the sides of the metal lines. To measure an edge-exclusion structure, multiple measurements are made along a line that extends up the rising edge of the film. In this case, the long axes of the excitation and probe fields are typically oriented perpendicular to that line (i.e., tangent tp the edge), and the short axes of the fields are oriented along the line. This configuration minimizes acoustic reflections that may occur near the edge of the film, and ensures the highest possible spatial resolution.

In addition, the wavevector of the excitation field is selected to produce accurate measurements of the above-mentioned small-scale structures. The wavevector is adjusted by changing the angle (α in FIG. 1A) separating the excitation beams. When measuring an edge-exclusion structure, for example, the selected wavevector is one that launches acoustic waves at a frequency that is sensitive to changes in overlying film thickness, but relatively insensitive to changes in the underlying film thickness. This methodology can be applied to edge-exclusion structures where tungsten and titanium:nitride are used, respectively, as the overlying and underlying films. Here, a wavevector between 200,000–700,000 m$^{-1}$ results in acoustic frequencies that are typically sensitive to chances in the tungsten film thickness, but insensitive to thickness changes in the titanium:nitride thickness.

For the damascene-type structures, the selected wavevector is one that generates an acoustic wavelength that is relatively long compared to the width of the metal lines, which are typically on the order of a micron or less. This ensures that the width of the lines has a minimal effect on acoustic modes propagating inside.

The optical wavelength of the excitation and probe pulses are also selected to produce accurate measurements of the small-scale structures described above. In the case of damascene-type structures, the excitation wavelength is chosen to be absorbed by the metal lines, and not absorbed by the surrounding structure (typically silicon dioxide). Since copper is typically used for the metal lines in damascene-type structures, an effective wavelength is in the visible portion of the spectrum, e.g., 532 nm. Wavelengths that are not useful include those in the infrared (e.g., 1064 nm) which are highly reflected by the copper. When measuring the edge-exclusion structure the wavelength is chosen so that the light is absorbed by both the overlying film (e.g., tungsten) excluded from the edge, and the underlying film (e.g., titanium nitride) exposed in the edge-exclusion zone. An appropriate wavelength for this case is 1064 nm. Using this wavelength, ISTS measures the rising properties of the overlying film, the thickness of the underlying film, and the width of the edge-exclusion zone.

Figure 3:
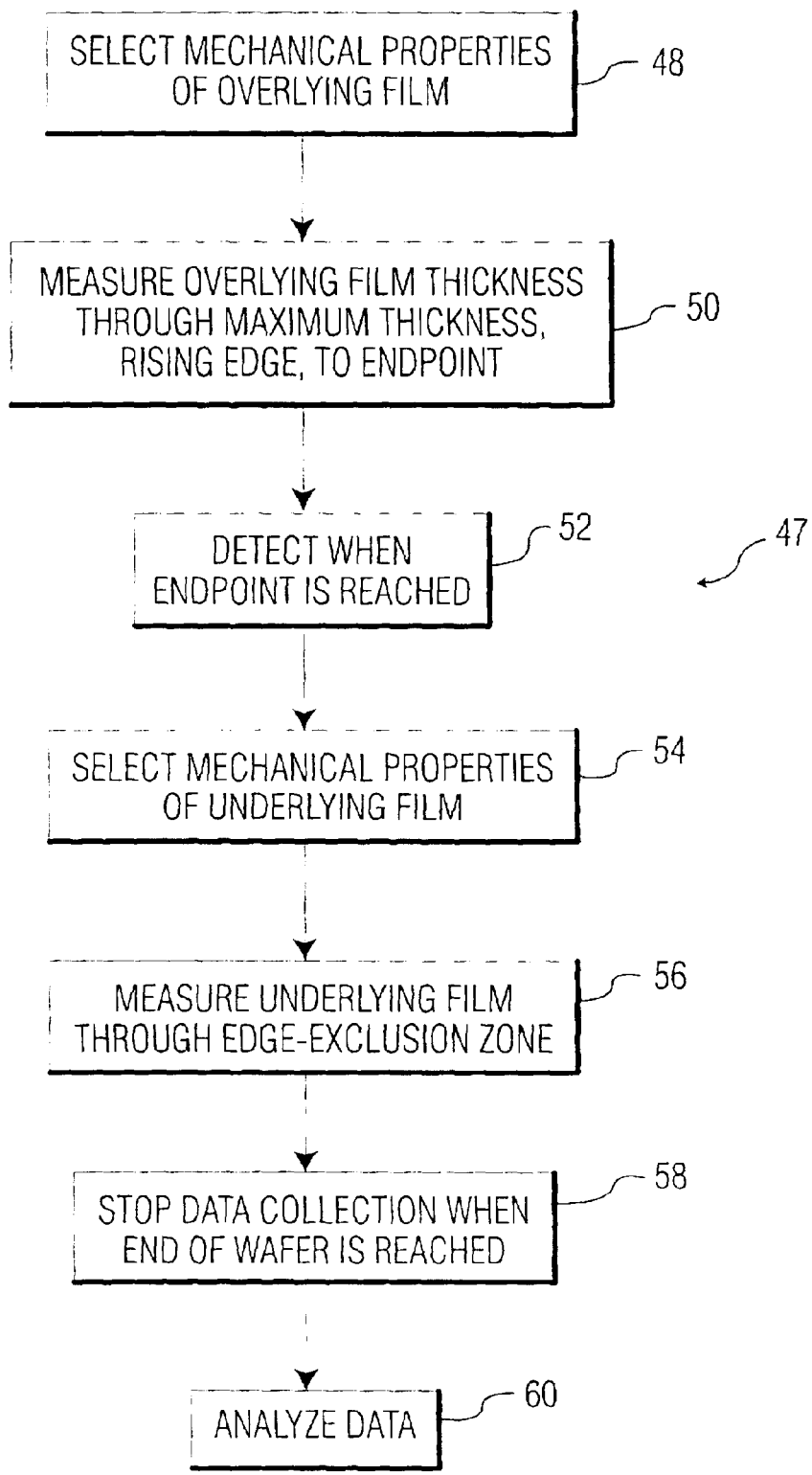
FIG. 3 is a flow chart describing a method for determining film thickness by analyzing data taken from an edge-exclusion structure.
Figure 4:
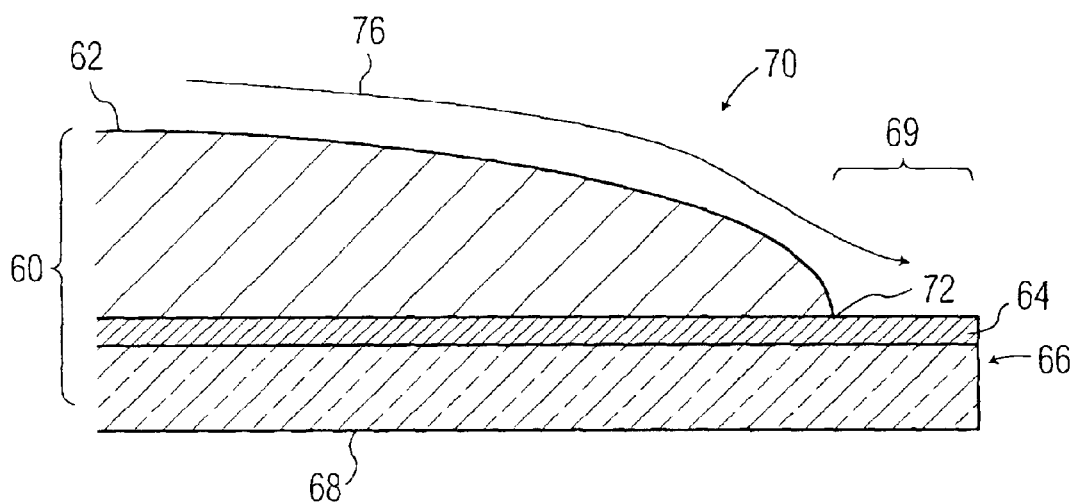
FIG. 4 is a cross-sectional, schematic drawing of an edge-exclusion structure.

FIGS. 3 and 4 show, respectively, a flow chart describing a method 47 for analyzing data collected from a typical edge-exclusion structure, and a schematic drawing showing the structure 60 where the measurements are made. The structure 60 includes an overlying film 62 (typically tungsten or copper) separated from an edge 66 of a silicon wafer 68 by an edge-exclusion zone 69. The overlying film is deposited or electroplated onto an underlying film 64 (typically titanium, tantalum, or alloys thereof) that extends to the edge 66 of the wafer 68. The overlying film 62 decreases from its maximum thickness value (typically a few thousand angstroms) to 0 angstroms along a "build-up region" 70 of the film. The build-up region 70 typically has a length of a few hundred microns that extends from the region separating: 1) a point where the overlying film's thickness is greater than about 80% of the film's maximum thickness; and 2) an endpoint 72 where the overlying film has 0 thickness. In the edge-exclusion zone 69, the underlying film 64 is exposed from the endpoint 72 to the wafer's edge 66.

To correctly determine film thickness, the material properties (i.e., density and sound velocities) of the overlying and underlying films are used in the above-mentioned calculations along with the wavevector and acoustic frequency measured in the small-scale structure. In one embodiment, the overlying film is measured by first selecting the film's mechanical properties and using these in the thickness calculation (step 48). Measurements are then made starting at a point near the maximum thickness of the overlying film, through the build-up region, and onto the film's endpoint (step 50). This measurement path is indicated in FIG. 4 by the arrow 78. Since measurements along an edge-exclusion zone are typically performed using an automated instrument, the analysis method must detect when the underlying film's endpoint is reached (step 52). Both the time-dependent shape and acoustic frequency of the signal waveform will change abruptly when this happens, and thus these properties can be used to detect this position. This can be done, for example, by analyzing the time-dependent shape of the signal waveform, or by finding an abrupt change in the signal waveform's frequency. Once the endpoint is reached, the mechanical properties used in the thickness calculation are switched to those of the underlying film (step 54). These properties are then used to calculate thickness using data from measurements made throughout the exclusion zone (step 56). Data collection is stopped once the wafer's end is reached (step 58); this region is best indicated by the absence of a signal waveform. The resulting data are then analyzed to determine properties such as overlying and underlying film thickness, length of the build-up region, and the width of the edge-exclusion zone (step 60).

The method described above can also be extended to measure film thickness along other regions of a wafer. For example, measurements can be made along the wafer's diameter to include: 1) the thickness of a cross-sectional slice of the wafer; and 2) the thickness of edge-exclusion structures on each side of the cross-sectional slice. These measurements are particularly useful, as they indicate a "usable" portion of the film that has an adequate thickness (e.g., 95% of the film's mean thickness value), and can therefore be used to qualify device-fabrication processes.

The method for determining the thickness of metal lines included in damascene-type structures is similar to that described in U.S. Ser. No. 08/783,046 (entitled METHOD AND DEVICE FOR MEASURING FILM THICKNESS, filed Jul. 15, 1996). For this application, the method is modified to include the geometry of the metal lines in the calculation. Specifically, in addition to the metal used to form the metal lines (copper is typically used in this application) the line width, periodicity, and cross-sectional geometry are taken into account in the calculation. In essence, the thickness of the copper bars in a damascene-type structures are measured by initiating acoustic waves alone the long dimension of the bars using ISTS, and then sampling these waves with a probe beam.

Figure 5:
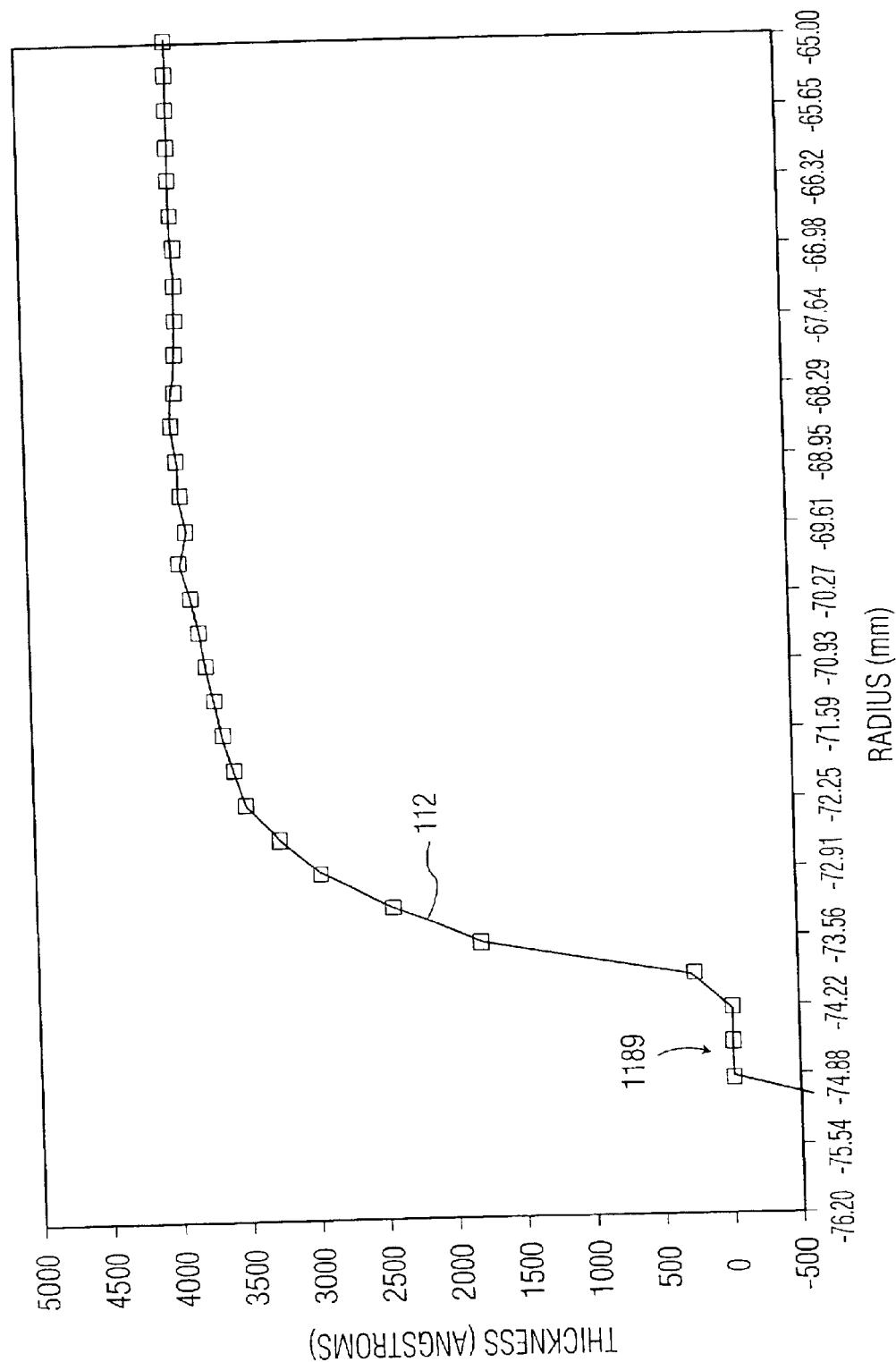
FIG. 5 is a plot of tungsten film thickness as a function of distance measured using ISTS in an edge-exclusion structure.
Figure 6:
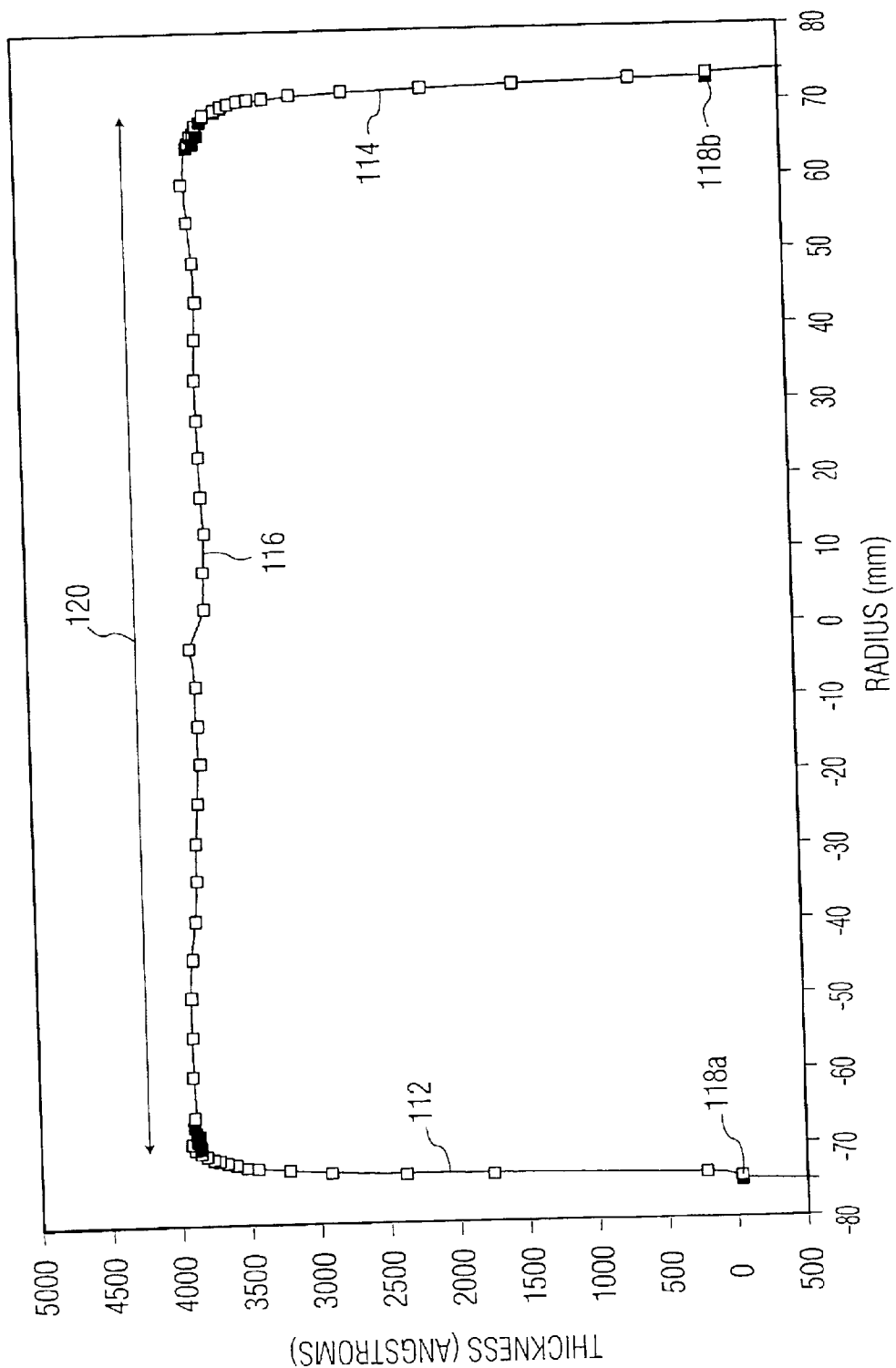
FIG. 6 is a plot of tungsten film thickness as a function of distance measured across a diameter of a silicon wafer structure using ISTS.

FIGS. 5 and 6 show, respectively, data collected from an edge-exclusion structure and across the diameter of a tungsten/titanium:nitride/silicon dioxide/silicon structure. The underlying titanium:nitride and silicon dioxide films had, respectively, thicknesses of 1100 and 5500 angstroms. In this case, the wavevector of the excitation field (698,131 $m^{-1}$) is set so that the ISTS-initiated acoustic waves have a frequency that is sensitive to changes in the tungsten film thickness, but relatively insensitive to changes in the titanium:nitride thickness. This is possible because tungsten has a relatively high density (19,300 $kg/m^3$) compared to that of titanium:nitride (5400 $kg/m^3$); small thickness variations in tungsten result in significant mass-loading of the silicon, and are therefore relatively easy to measure. The excitation wavelength for these data was 1064 nm, and the short axes of the excitation and probe spots are orientated along the direction that the wafer is translated.

FIG. 5 shows the properties of the tungsten and titanium:nitride films in the edge-exclusion structure. As indicated by shape of a rising edge 112, the tungsten film starts building up at a distance of about 74.22 mm from the wafer center, reaching a thickness of 3870 angstroms at a distance of 65.00 mm from the wafer's center. The smooth, systematic build-up indicates the precision of the measurement, which is estimated to be on the order of a few angstroms. The data also indicate a titanium:nitride exclusion zone 118a that has a width of about 660 microns. FIG. 6 shows similar data taken across a diameter of the same wafer. Here, the curve 110 includes data indicating rising edge 112, a falling edge 114 near the edge-exclusion zones 118a, 118b at the wafer's edges. These regions bracket the center portion 116 of the film that has a relatively constant film thickness. The arrow 120 in the figure indicates a portion of the film (in this case 148.8 mm) that is greater than 80% of the film's maximum thickness value, and is therefore considered to be "usable" for fabrication purposes.

Figure 7A:
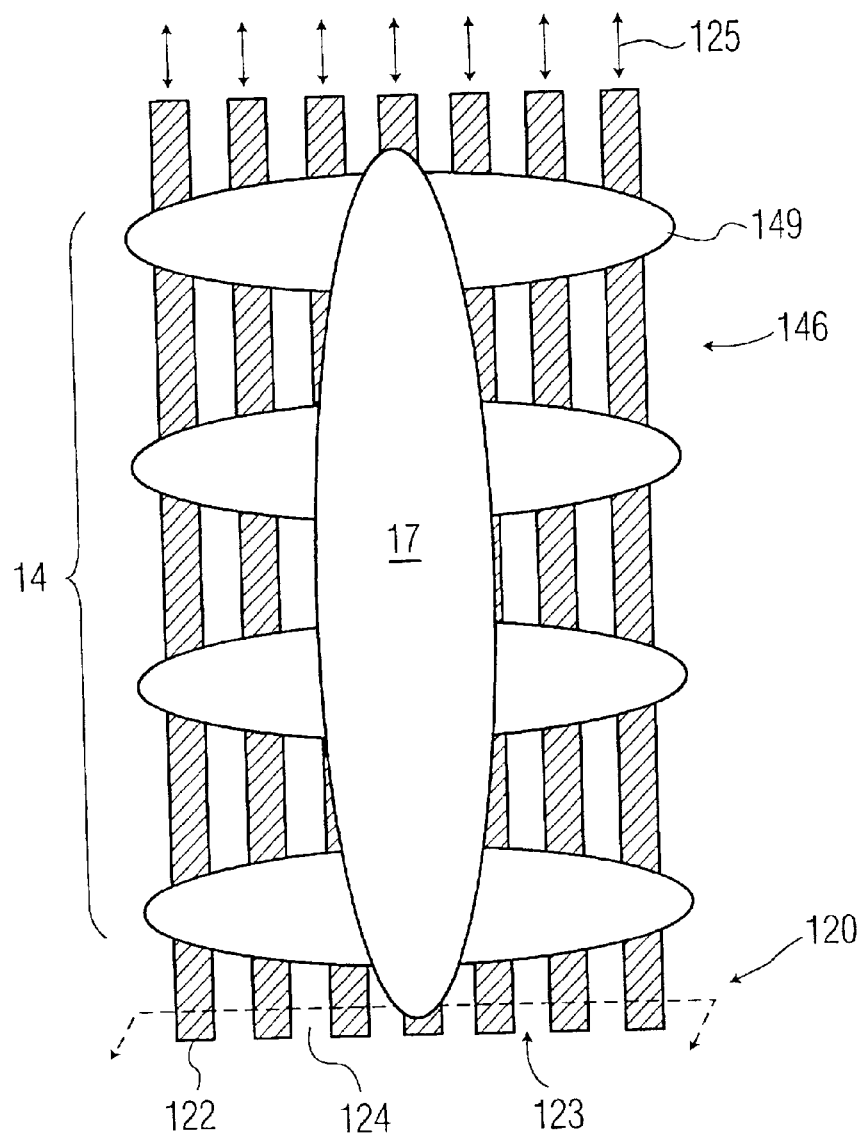
FIG. 7A is a top view of a damascene-type structure being measured with ISTS.
Figure 7B:
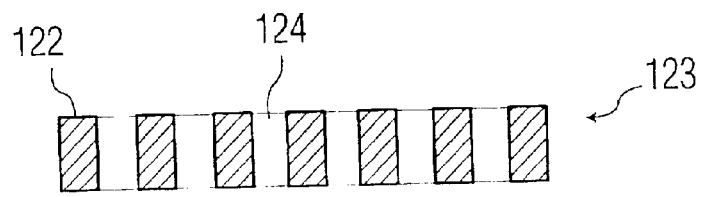
FIG. 7B is a cross-sectional view of the damascene-type structure of FIG. 7A.

FIGS. 7A and 7B indicate how film-thickness measurements are made in a damascene-type structure 120. Here, the structure 120 includes a series of metal lines 122 deposited into trenches 123 etched into a silicon dioxide film 124. Metal lines in this type of structure are typically made of copper and have a width less than 1 micron and a length of several millimeters. During ISTS, the excitation field 14 is typically oriented with the long axis extending parallel to the metal lines 122. Thus, the dark 14a and light 14b regions of the field 14 are spaced periodically along the lines. As indicated by the arrows 125, this generates acoustic modes that propagate along the metal lines. Acoustic waves are initiated in and coherently propagate along multiple lines since the width of the excitation field 14 is larger than the width of a single line. These modes are collectively measured by irradiating multiple lines with a probe field 17. The field 17 is diffracted off the surface ripple in the irradiated lines. The diffracted signal is then detected and analyzed in combination with copper's material properties and the width, periodicity, and cross-sectional geometry of the metal lines to determine the film thickness.

Figure 8:
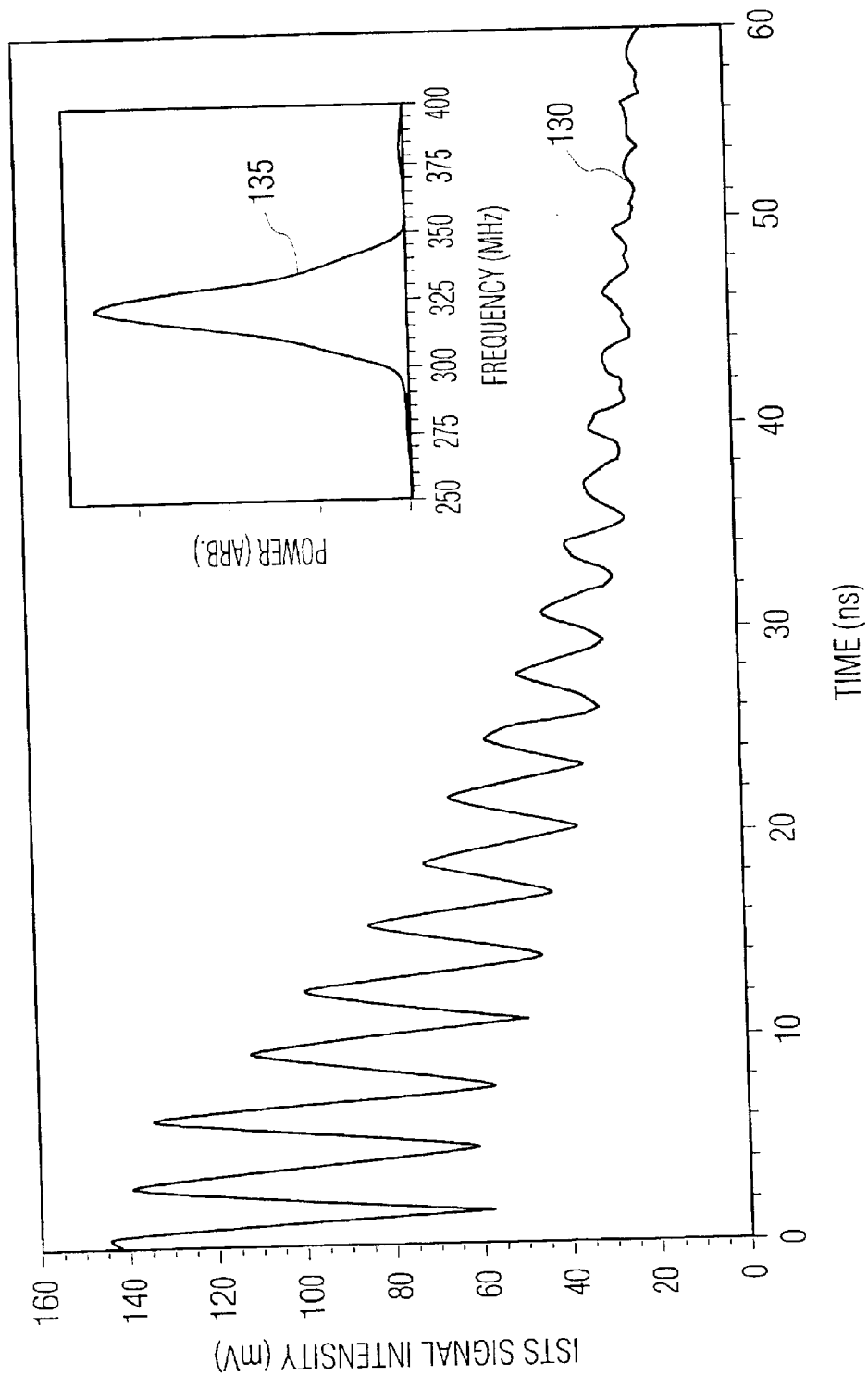
FIG. 8 is a plot (signal intensity vs. time) of a signal waveform measured from a copper damascene-type structure similar to that shown in FIGS. 7A and 7B.

FIG. 8 shows time-dependent 130 and frequency-dependent 135 data measured from a copper damascene-type structure using the above-describe method. The structure included copper metal lines having a thickness of 8000 angstroms, a width of 1 micron, periodicity of 2 microns, and a rectangular cross section. The data have a high signal-to-noise ratio and acoustic damping similar to that shown in FIG. 3, indicating that acoustic modes excited in the copper damascene-type structure diffract the probe field with an efficiency that is comparable to that achieved from non-patterned copper films. The repeatability of these data was about 0.2 MHz, indicating that film thickness can be measured with a repeatability of better than 10 angstroms.

Once measured, the acoustic velocity is processed using a computer-implemented algorithm that determines how the damascene structure "mass loads" the underlying silicon substrate. In general, the mass-loading algorithm determines the total mass of the overlying damascene structure (i.e., the mass of the copper and oxide layers). Thickness is then determined using the density of the copper and oxide materials. Mass loading increases with the mass of the overlying structure. In other words, an increase in mass decreases the velocity of the acoustic wave. The velocity depends on i) the film thickness and ii) the width and periodicity of the damascene bars. As described elsewhere, these latter properties can be determined by monitoring the reflected and diffracted probe beams that leave the sample. (Note: these diffracted beams are different from the signal beams).

Figure 11:
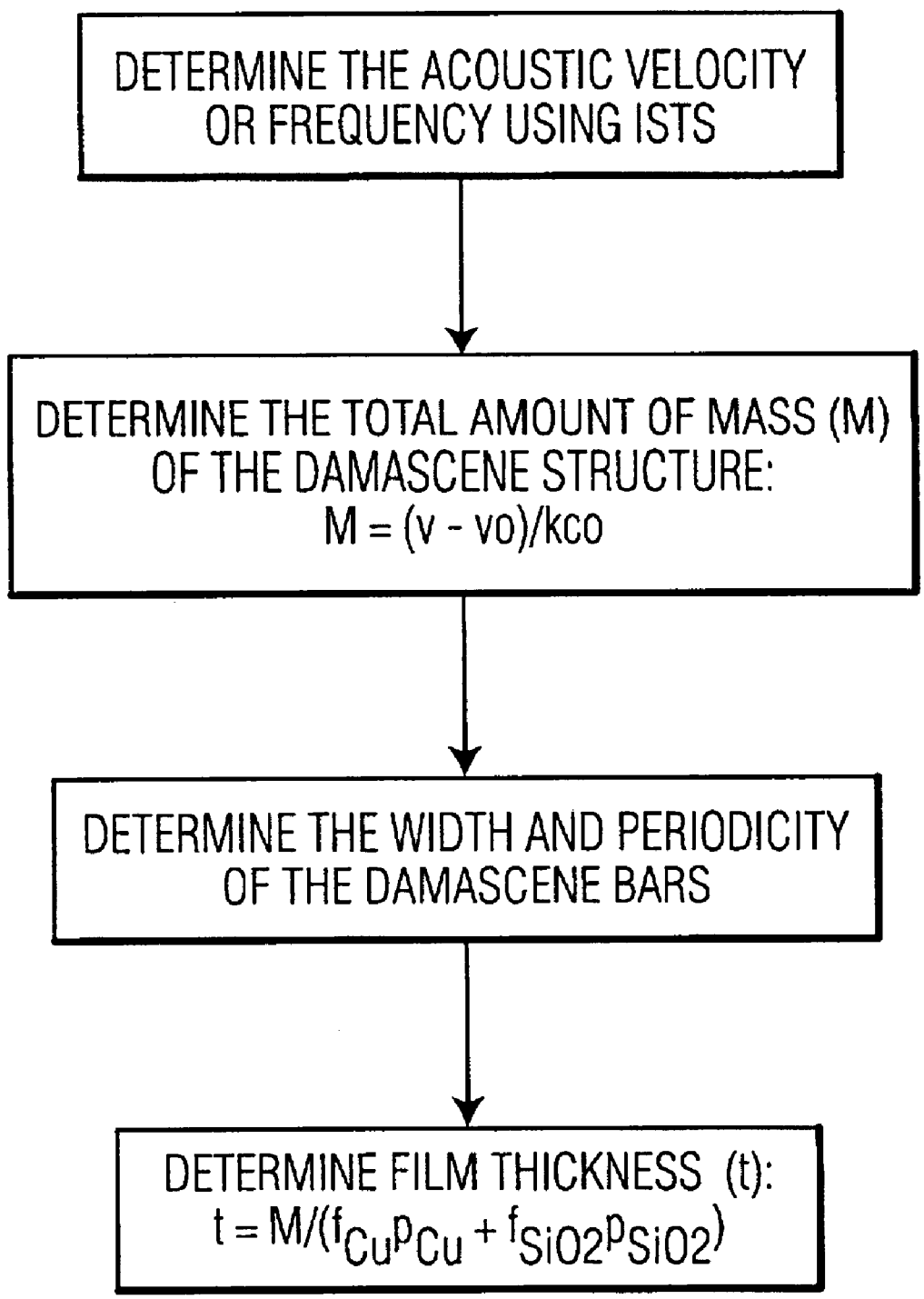
FIG. 11 shows a flow chart for a computer-implemented algorithm for determining the thickness in Damascene-type structures.

The general algorithm for determining copper film thickness from damascene-type structures is described by the steps listed below. The flow chart presented in FIG. 11 summarizes these steps.

Step 1: Determine the acoustic wave velocity or frequency using ISTS. The wavelength of the acoustic wave is preferably long (e.g. typically 10–15 microns) compared to the width of the damascene pattern, and the acoustic waves propagate along the long dimension of the copper bars.

Step 2: Determine the total amount of mass (M) in the overlying damascene structure (oxide and copper films) using the following equation:

$$M=(v-v_o)/kc_o$$

where $v_o$ is the known Rayleigh wave velocity of the substrate, $c_o$ is a elastic constant of the substrate that is known or can be measured experimentally, k is the acoustic wavevector, and v is the acoustic velocity measured from the structure using ISTS.

Step 3: Determine the width and periodicity of the bars in the damascene structure. This is typically well-known for the structure being measured, but can also be determined by measuring the diffracted and reflected beams leaving the sample. Specifically, the periodicity is related to the angle ($\theta$) of the diffracted beams leaving the sample using the equation $d \cdot \sin \theta = n\lambda$, where d is the bar periodicity, n is the diffracted order, and $\lambda$ is the optical wavelength. The reflectivity of the incident radiation can be analyzed to determine the bar width.

Once determined, the bar width defines the fraction of the damascene structure that is copper ($f_{Cu}$) and the periodicity defines the fraction that is oxide ($f_{SiO2}$). Note that $f_{Cu}+f_{SiO2}=1$.

Step 4: Assuming the thickness of the oxide and copper are the same, the thickness (t) of these layers is given by:

$$t=M/(f_{Cu}\rho_{Cu}+f_{SiO2}\rho_{SiO2})$$

where $\rho_{Cu}$ and $\rho_{SiO2}$ are, respectively, the densities of the copper and oxide films.

Optical System for ISTS Measurements

A suitable optical system for performing the ISTS measurements is described in U.S. Ser. No. 08/783,046 (entitled METHOD AND DEVICE FOR MEASURING FILM THICKNESS, filed Jul. 15, 1996), the contents of which have been incorporated herein by reference.

Figure 9:
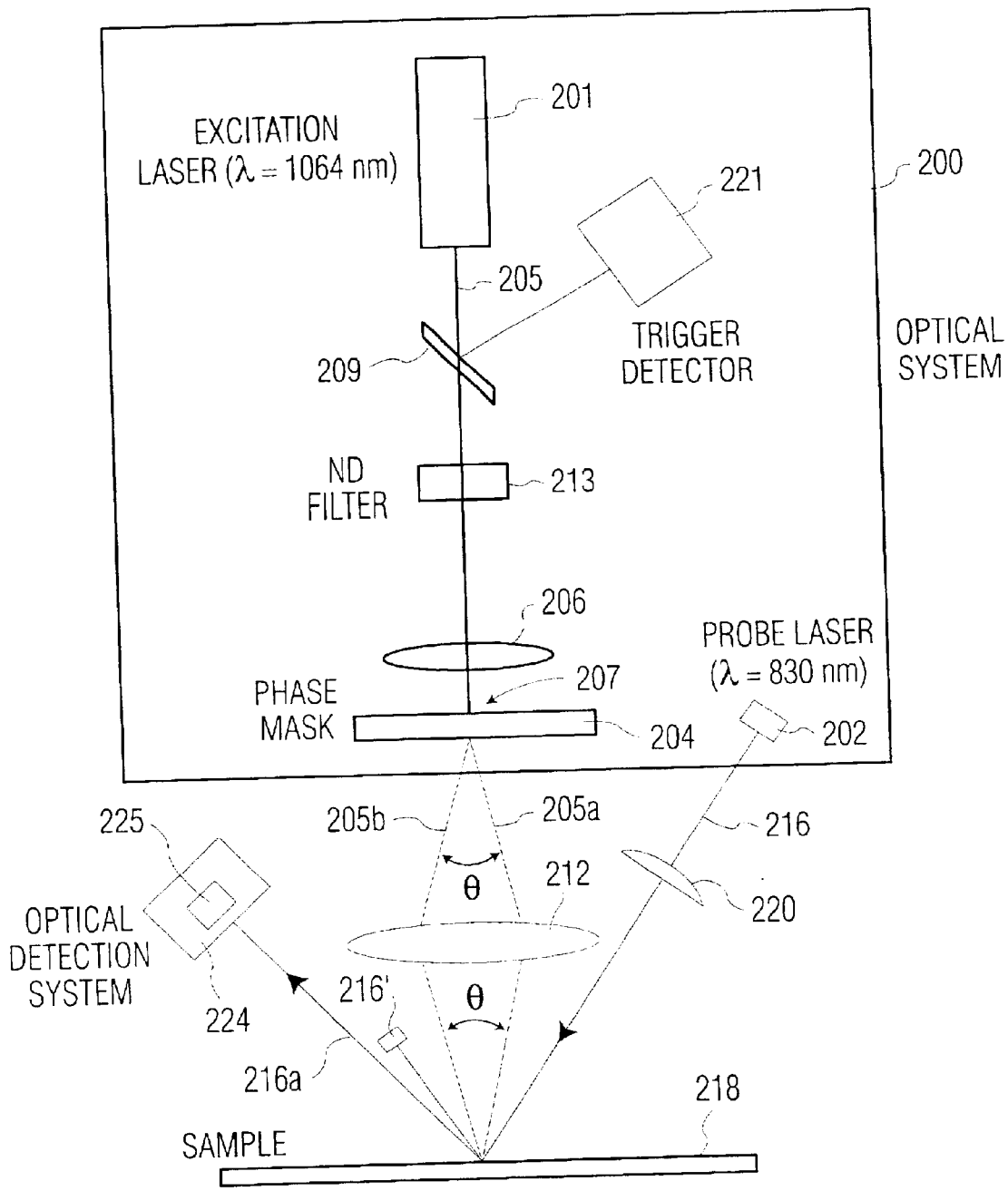
FIG. 9 is a schematic drawing of an optical system and an optical detection system for measuring a small-scale structure according to the method of the invention.
Figure 10:
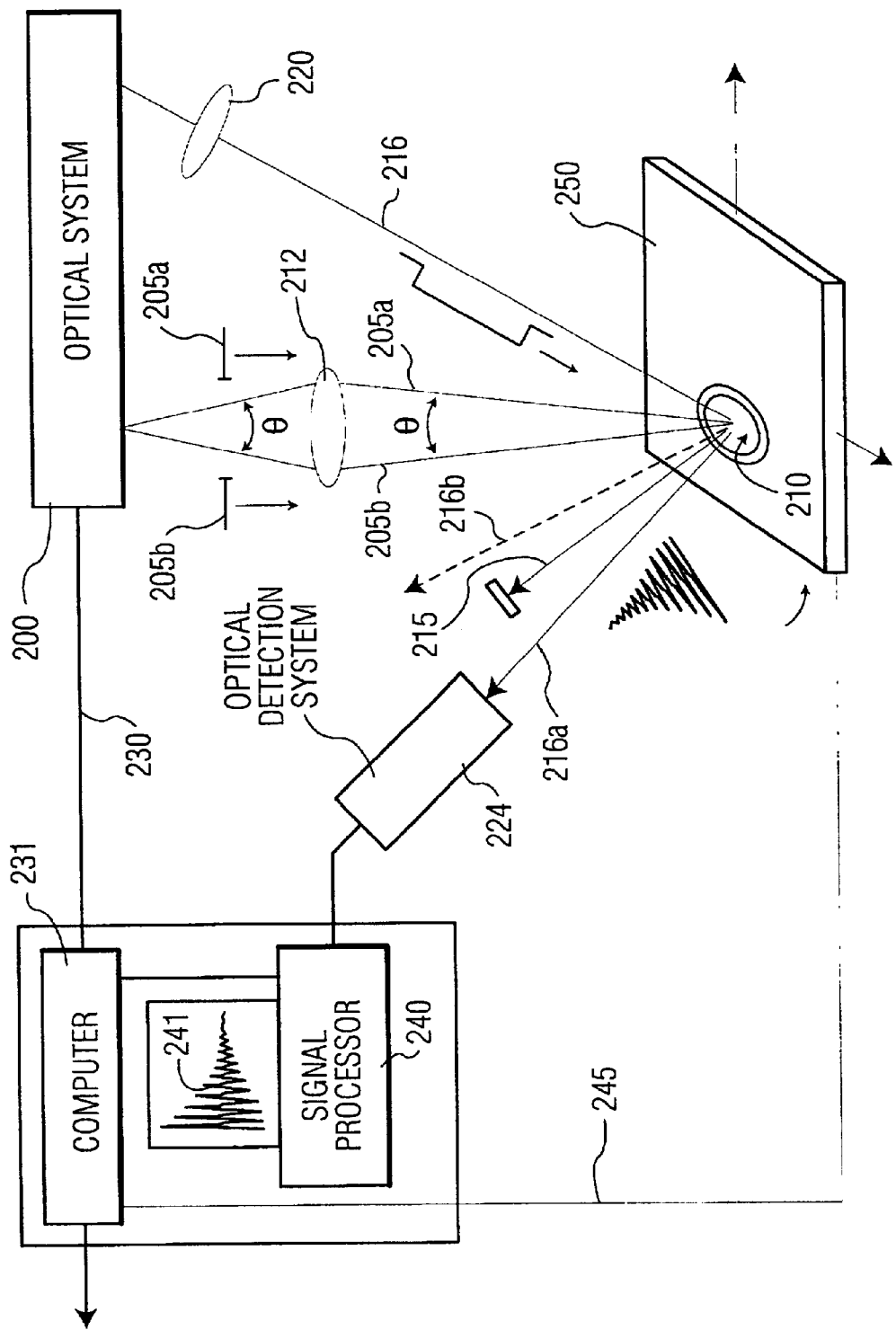
FIG. 10 is a schematic drawing of an optical system, optical detection system, computer, and signal processor for measuring a small-scale structure according to the invention.

FIGS. 9 and 10 show particular optical systems 200 for making four-wave mixing measurements on small-scale structures. The system 200 features an excitation laser 201 that generates a single excitation beam 205. The excitation laser is typically a pulsed Nd:YAG laser that is Q-switched, mode-locked, or both. A particularly desirable excitation light source is a microchip laser, such as that described in U.S. Pat. No. 5,394,413. The pulse duration of the excitation beam 205 must be short enough to impulsively stimulate material motions in the film via ISTS, and is typically about 0.5 nanoseconds. The output pulse typically has an energy of about 10 microjoules, and a wavelength of 1064 or 532 nm.

During operation, the single excitation beam 205 the single excitation beam 205 passes through a partially reflecting optic 209 that reflects a portion of the excitation beam 205 into a triggered detector 221. As shown in FIG. 10, the trigger detector 221 sends an electrical signal 230 to a computer 231 that processes data generated by the optical system 200. The single excitation beam 205 then passes through an attentuating neutral density filter 213 and is then focused onto a phase mask 204 using a cylindrical lens 206. The phase mask 204 includes a pattern 207 that diffracts the incident excitation beam into two spatially diverging beams 205$a,b$, each having a pulse duration of about 0.5 ns. The angle of divergence $\theta$ is determined by the diffracting pattern 207 on the phase mask 204. Once diffracted, the diverging beams 205$a$, 205$b$ are imaged onto a sample 210 using an imaging lens 212. This forms an excitation radiation pattern (14 in FIG. 1) having a well-defined wavevector. The excitation pattern excites acoustic modes on the sample's surface. Excitation patterns having different wavevectors are formed simply by translating the phase mask to move different diffracting patterns into the excitation beam's path.

A probe laser 202 (typically a single-mode diode laser producing between 0.1 and 1 Watt in the visible or infrared frequency range) in the optical system 200 generates a laser beam 216 that is focused to a field (17 in FIG. 1B) that is smaller than the spot size of the excitation radiation field using a focusing lens 220. Once focused, the beam 216 is diffracted to form a pair of signal beams 216$a$, 216$b$. One of the signal beams 216$a$ is then directed onto an optical detection system 224, while the reflected pulse beam 216' is blocked. The optical detection system 224 contains a photodetector 225 that has a high bandwidth (e.g., 1 GHz) to time resolve the individual features of the signal beam. In this way, the entire temporal duration of the acoustic modes can be sent to a signal processor 240 and measured in real time (e.g., 100 nanoseconds) to generate a signal waveform 241. The waveform signal-to-noise ratio can be enhanced by signal averaging at a rate limited only by the repetition rate of the laser (typically around 500 Hz) or the speed of the recording electronics (typically on the order of a millisecond). Signal averaging typically improves the signal-to-noise ratio to greater than 500:1. Data-collection times for averaged signals are typically one or two seconds.

The signal waveform 241 is then processed by a computer 231 as described above to determine, e.g. the thickness of a metal film at a single point on the sample 210. The computer 231 then sends a signal 245 to a motor-controlled mechanical stage 250 that moves the sample to a new location. The computer 231 then repeats the above-described process to determine a thickness of the metal film at a second location. Under the control of the programmed computer 231, this entire process is repeated multiple times to measure properties of the film across its edge, e.g. thickness.

Other Embodiments

Other embodiments are within the scope of the invention. For example, other optical, photoacoustic methods may be used to determine film thickness in the structures described above. These methods include pulse-echo, beam-deflection, and other four-wave mixing methods for initiating acoustic phonons. Examples of these methods are described in "Ultrasonic multilayer metal film metrology", published in Solid State Technology (June, 1997) and "Real-time detection of laser-induced transient gratings and surface acoustic wave pulses with a Michelson interferometer", published in Journal of Applied Physics (Nov. 15, 1997), the contents of which are incorporated herein by reference.

In other embodiments, properties of damascene-type structures, such as the width or spacing of the metal lines, are measured by analyzing the properties of the diffracted probe or signal beams. For example, the angular position of the diffracted probe radiation can be analyzed to determine the periodicity and width of the rectangular bars in the damascene-type structure. More features of the damascene-type structure are determined by measuring the relative intensity of the diffracted orders. For example, these intensities can be analyzed to determine the thickness of the oxide regions surrounding the copper bars. Intensity and spatial variations in these orders can also indicate defects in the sample, such as missing or irregular-shaped bars. In addition, other properties of the diffracted signal beam, such as the signal component due to thermal diffusion and the damping of the acoustic frequency, can be analyzed to determine properties (e.g., thickness, periodicity, and number of defects) of the damascene type structure.

The method and apparatus described above can also be applied to other small-scale structures, such as the "streets" (i.e., the areas between devices on a wafer), bond pads, and device features contained in a patterned semiconductor wafer.

In still other embodiments the optical system may be modified to increase the quality of the data collected. Modifications include those described in U.S. Ser. No. 08/885,555 (entitled IMPROVED TRANSIENT-GRATING METHOD AND APPARATUS FOR MEASURING MATERIAL PROPERTIES, filed Jun. 30, 1997), the contents of which are incorporated herein by reference. Other modifications include using heterodyne amplification to improve the measurement of weak signal beams.

Still other embodiments are within the scope of the following claims.

What is claimed is:

1. A method for measuring a thickness of a structure, the structure comprising an overlying film and an underlying film, positioned on a substrate, where a thickness of the overlying film decreases until a section of the underlying film is exposed, comprising of:

exciting an acoustic component corresponding to the overlying film in a first portion of the region using at least one excitation laser beam;

detecting the acoustic component with a device that irradiates the region with a probe to generate a signal beam;

analyzing a time-dependent feature of the signal beam corresponding to the acoustic component, to determine a thickness of the overlying film in the first portion of the region;

translating the structure or the excitation and probe beams; and repeating the exciting, detecting, and analyzing steps to determine a thickness of the overlying film in a second portion of the region;

wherein the exciting, detecting, analyzing and translating are repeated until the thickness of the overlying film is measured from where the underlying film is exposed.

2. The method of claim 1 wherein the signal beam comprises a diffracted beam.

3. The method of claim 2, further comprising repeating the exciting, detecting, analyzing, and translating to determine a property of the structure in each of multiple portions of the region.

4. The method of claim 3, wherein the analyzing further comprises comparing material properties of the overlying and underlying films and the acoustic frequency and a wavevector to a mathematical model to determine a property of the structure in the first portion of structure.

5. The method of claim 2, wherein the structure comprises overlying and underlying films disposed on a semiconductor wafer, and the exciting, detecting, analyzing, and translating are repeated until a property of the underlying film is measured from where it is exposed to the edge of the wafer.

6. The method of claim 5, further comprising determining the distance from where the underlying layer is exposed to the edge of the semiconductor wafer.

7. The method of claim 5, wherein the film is measured across a region until a time-dependent shape of the signal waveform changes, an acoustic frequency of the signal waveform changes, or both the time dependent-shape and the acoustic frequency of the signal waveform change.

8. The method of claim 2, wherein the overlying film is selected from a metal consisting of tungsten, copper, aluminum, and alloys thereof.

9. The method of claim 2, wherein the underlying film is selected from the group consisting of titanium, titanium:nitride, tantalum, tantalum:nitride, and alloys thereof.

10. The method of claim 2, wherein the exciting further comprises exciting the acoustic component with at least one optical pulse having a duration less than 1 nanosecond.

11. The method of claim 10, wherein the exciting further comprises exciting time-dependent acoustic components in the structure by directing a spatially periodic excitation radiation field defined by a wavevector onto the structure, and the detecting step comprises detecting the acoustic components by diffracting probe radiation off a modulated optical or physical property induced on the structure's surface by the acoustic components.

12. The method of claim 11, further comprising determining a thick ness of the overlying or underlying layer by analyzing a density and acoustic properties of the overlying layer, the wavevector, and a frequency of the acoustic component.

13. The method of claim 1, wherein at least a portion of the exposed underlying film forms an edge profile of the structure.

14. A method for measuring a thickness of a structure, the structure comprising an overlying film and an underlying film, positioned on a substrate, where a thickness of the overlying film decreases until a section of the underlying film is exposed, comprising:
   exciting an acoustic component corresponding to the overlying film in a first portion of the region using at least one excitation laser beam;
   detecting the acoustic component with a device that irradiates the region with a probe beam to generate a signal beam;
   analyzing a time-dependent feature of the signal beam corresponding to the acoustic component, to determine a thickness of the overlying film in the first portion of the region;
   translating the structure or the excitation and probe beams; and repeating the exciting, detecting, and analyzing steps to determine a thickness of the overlying film in a second portion of the region;
   repeating the exciting, detecting, analyzing, and translating steps to determine a property of the structure in each of multiple portions of the region;
   wherein the signal beam comprises a diffracted beam;
   wherein the thickness of the overlying film is the property determined in each of the multiple portions of the region; and
   wherein the exciting, detecting, analyzing, and translating are repeated until the thickness of the overlying film is measured from where the underlying film is exposed to where the overlying film's thickness is at least 80% of its mean value.

15. The method of claim 14, wherein the exciting, detecting, analyzing, and translating steps are repeated in the structure until: (a) the thickness of the overlying film is measured on one side of the structure from where the underlying film is exposed to where the overlying film's thickness is at least 80% of its mean value; (b) the thickness of the overlying film is measured where its thickness is greater than 80% of its mean value: and (c) the thickness of the overlying film is measured on an opposing side of the structure from where the underlying film is exposed to where the overlying film's thickness is at least 80% of its mean value.

16. The method of claim 15, wherein the structure is a semiconductor wafer, and the exciting, detecting, analyzing, and translating steps are repealed until the overlying films thickness is measured along a diameter of the wafer.

17. An apparatus for measuring a structure comprising overlying and underlying films in a region where the overlying film's thickness rapidly decreases until the underlying film is exposed, comprising:
   at least one excitation laser beam that irradiates a first portion of the region to excite an acoustic mode;
   a probe laser beam that irradiates the first portion of the region and generates a signal beam;
   an analyzer that analyzes the signal beam to determine a property of the structure in the first portion of the region; and
   a stage that translates the structure or the excitation and probe laser beams so that a second portion of the region at an edge of the structure is irradiated with the excitation and probe laser beams;
   wherein said analyzer includes a means for comparing a property determined in the first portion of the region with a property determined in a second portion of a region by comparing the signal beams, wherein if a signal representing the property determined in the second portion of the region does not approximate a signal representing the property determined in the first region said analyzer indicates that an underlying film at the edge of the structure is exposed and such measurement is of the underlying film and not of the thickness of the overlying film.

18. The apparatus of claim 17, wherein the analyzer comprises a computer configured to translate the stage.

19. The apparatus of claim 17, wherein the analyzer comprises a computer configured to determine the property of the structure.

20. The apparatus of claim 19, wherein the property is thickness.

21. The apparatus of claim 19, wherein the structure is a semiconductor wafer, and the computer is configured to repetitively translate the stage until the overlying film's thickness is measured along a diameter of the wafer.

22. The apparatus of claim 21, wherein the overlying film is selceted from a metal consisting of tungsten copper, aluminum, and alloys thereof.

23. The apparatus of claim 22, wherein the underlying film is selected from the group consisting of titanium, titanium: nitride, tantalum, tantalum: nitride, and alloys thereof.

24. The apparatus of claim 22, wherein the excitation laser beam comprises at least one optical pulse having a duration less than 1 nanosecond.

25. A method for measuring a structure including an underlying and overlying film and an edge, said method comprising:
   generating an excitation field having an area having a long axis and a short axis;
   aligning the long axis substantially parallel to the edge to excite an acoustic component;
   detecting the acoustic component by irradiating it with a probe laser beam to generate a signal beam;
   analyzing a feature of the signal beam corresponding to the acoustic component to determine a property of the structure;
   translating the structure or the excitation and probe laser beams; and
   repeating the excitation, detection, and analyzing steps to determine another property of the structure so as to measure a thickness of a structure having a same determined property to the edge until the underlying film is exposed.

26. A method for measuring at least one property of a structure comprising overlying and underlying films formed on a substrate, said method comprising:
   generating an optical excitation field characterized by a wavevector chosen to selectively excite either the overlying film of the underlying film;
   exciting an acoustic component with the optical excitation field;
   detecting the acoustic component with a probe laser beam that irradiates the component to generate a signal beam; and
   analyzing a time-dependent feature of the signal beam corresponding to the acoustic component to determine a property of the overlying or underlying film so as to measure a thickness of a structure having same determined property to an edge of the substrate until the underlying film is exposed.

* * * * *